E. N. BACHELDER.
COFFEE URN.
APPLICATION FILED MAR. 9, 1908.
951,626.
Patented Mar. 8, 1910.
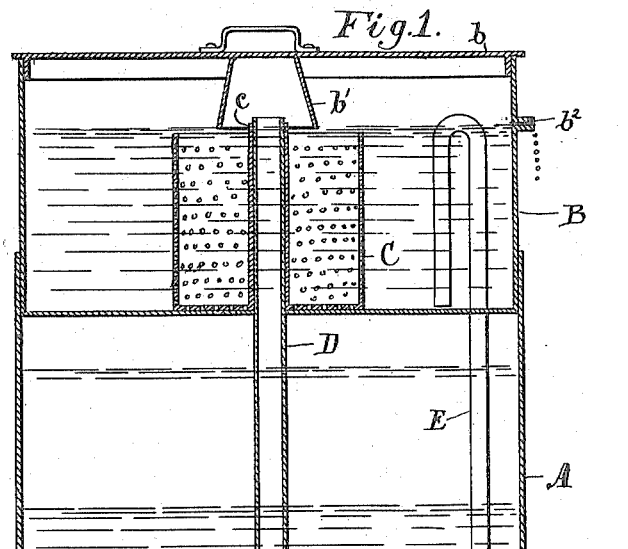
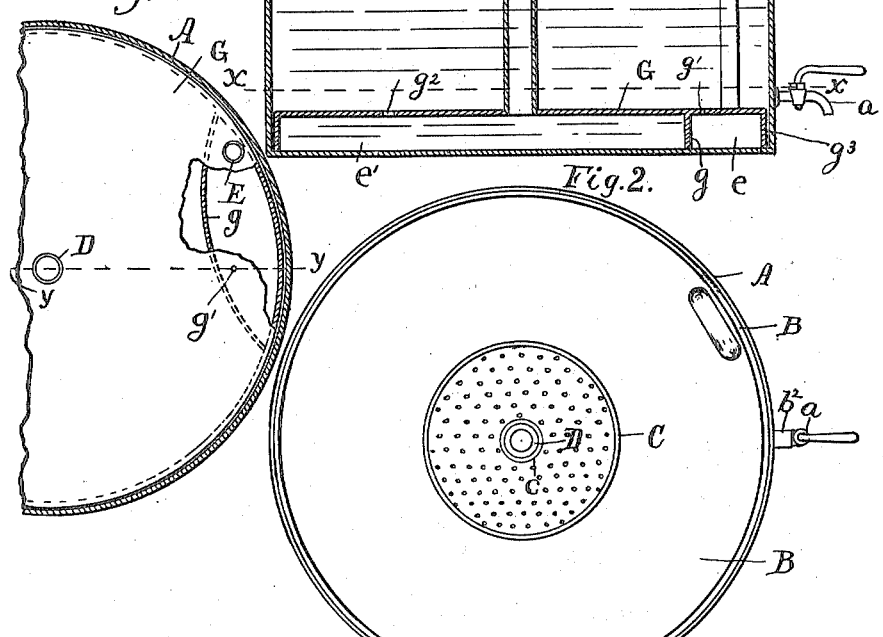
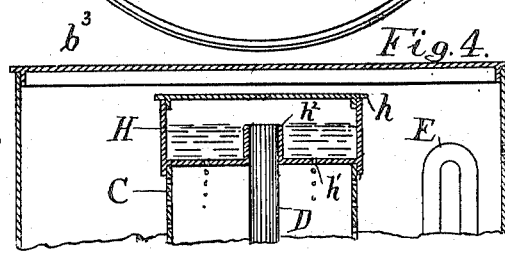
Witnesses:
Charles H. Johnston
Albert R. Moore
Inventor:
Elmer N. Bachelder
by S. W. Bates
Atty.

UNITED STATES PATENT OFFICE.

ELMER N. BACHELDER, OF PORTLAND, MAINE.

COFFEE-URN.

951,626.   Specification of Letters Patent.   Patented Mar. 8, 1910.

Application filed March 9, 1908. Serial No. 419,837.

*To all whom it may concern:*

Be it known that I, ELMER N. BACHELDER, a citizen of the United States of America, and a resident of Portland, county of Cumberland, State of Maine, have invented certain new and useful Improvements in Coffee-Urns, of which the following is a specification.

My invention relates to an apparatus for preparing infusions of coffee, tea and other like substances and it may be used either for large apparatus such as are used in hotels, restaurants and boarding houses or for smaller sizes for domestic use.

In making an infusion of coffee it is desirable not to boil the infusion but to steep the coffee for a considerable length of time in water just below the boiling temperature until all the soluble elements are extracted from the coffee.

It has been common in coffee percolators to place the coffee in a pervious receptacle in the upper part of the percolator and cause a stream of boiling water to be delivered above the mass of coffee, allowing it to percolate downward through the coffee to the boiling space in the bottom of the percolator. In this process the infusion is allowed to boil after the process is once begun. Another common method is to pour boiling water onto the mass of coffee and allow it to percolate through and still another is to boil the coffee for a limited length of time. None of these methods set forth are entirely satisfactory for various reasons, particularly in the case of hotels and boarding houses where the cook cannot give the coffee making the minute attention which it requires.

The object of my invention is to construct a coffee urn by means of which coffee can be perfectly made in large or small quantities and with little or no care on the part of the cook, in other words the device is intended to be automatic in its operation and so constructed that the coffee will always be of a uniform degree of excellence.

I illustrate my invention by means of the accompanying drawing in which is shown an apparatus embodying my invention.

In the drawing, Figure 1 is a vertical section taken on the line $y\ y$ of Fig. 3, Fig. 2 is a plan of the device with the cover removed, Fig. 3 is a section on the line $x$—$x$ of Fig. 1 with a portion cut away, and Fig. 4 is a section like Fig. 1 showing a modification.

In the drawing like letters represent like parts.

In constructing the device, I provide a hot water tank for boiling the water and an infusion tank separated from the hot water tank and preferably above the same for preparing the coffee infusion, with means for conducting the boiling water from the former to the latter tank.

As shown in Figs. 1, 2 and 3, I make the hot water tank in the form of an open topped cylinder A and in the top is loosely fitted the infusion tank B so constructed as to be easily inserted and removed and supported at or near the top of the tank A. For the purpose of supporting the tank B and at the same time delivering boiling water to it, I provide a vertical hot water pipe D, here shown as extending vertically through the bottom of the tank B and terminating in the upper portion thereof. This pipe D is soldered or otherwise secured to the bottom of the tank B where it passes through so that it will make the tank B watertight. Adjacent to the bottom of the tank A is a boiler chamber from which boiling water is conducted through the pipe D to the tank B. As shown, I secure to the lower end of the pipe D a horizontal diaphragm G having downward extending flanges $g^3$ to form a support around the outer edge and to form also a shallow chamber open to the bottom of the tank. The diaphragm G is preferably made in the form of a disk which fits loosely in the tank A and thus forms a guide and support for the upper tank. A flange $g$ near one edge of the diaphragm G forms the space beneath the diaphragm into a main or boiling chamber $e'$ and a small steam chamber $e$. The boiling chamber connects with the lower end of the pipe D and the boiling of the water in the chamber $e'$ sends a stream of boiling water up through the pipe D and delivers it at the top of the infusion tank B.

An aperture $g^2$ in the diaphragm G allows sufficient water to flow from the tank A into the chamber $e'$ to take the place of that which passes up the pipe D and a smaller aperture $g'$ is formed for admitting a limited amount of water into the chamber $e$. The size of the aperture $g'$ is such that practically all the water admitted will be converted into steam. Means are provided for conveying the steam generated in the chamber $e$ to the bottom of the tank B and for discharging the contents of the infusion tank into the hot water tank after the infusion is made. As here shown, I provide a siphon tube E connecting with the steam chamber $e$ and passing thence up through the bottom of the tank B and terminating at or near the bottom of the tank B. Steam formed in the chamber $e$ will thus be carried up and delivered at the bottom of the tank B and when the supply of steam ceases and the tank begins to cool the condensation of the steam in the tube E starts the siphon and draws off the contents of the tank B discharging it into the steam chamber whence it finds its way into the main body of the tank A.

Convenient means are provided for holding the coffee in the tank B and as here shown, I provide an open topped cylinder C made of perforated copper or other pervious material, this cylinder having a central, vertical tube soldered to the bottom of the cylinder C and adapted to slip on over the upper end of the pipe D and rest on or near the bottom of the infusion tank B. This container may be easily and quickly taken out and put in and may be cleaned independently of the tank B.

Means are herein shown for causing the hot water which is delivered through the pipe D to fall within the cylinder C whereby it is made to percolate through the coffee. For this purpose I attach to the under side of the cover $b$, a cup-shaped flange $b'$ which covers the upper end of the pipe D and directs the overflow of this pipe into the cylinder C and through the coffee.

Means are provided for notifying the cook when the coffee is made and the process is complete and for this purpose I provide a small tell-tale or overflow tube $b^2$ placed in the side of the tank B and at such a height that when the tank B is filled up to the level of the tube $b^2$, the desired time will have elapsed during which it is desired that the coffee shall be steeped. This tube discharges a very small quantity of the infusion onto the stove or range and thus gives notice that the coffee is properly cooked. A suitable faucet $a$ is provided to draw off the coffee.

From what has been said the operation of my device will be readily understood.

Water in a specified quantity is put into the tank A, the tank B with its connecting parts first having been removed. The tank B is now slipped into place and the cylinder C is filled with a measured quantity of coffee. The urn is now placed on the stove or range, the bottom of the tank becomes heated and the water in the chamber $e'$ is raised to the boiling point, passing up through the pipe D and thence percolating through the coffee and gradually filling up the tank B. No pressure can accumulate in the upper part of the tank A on account of the relief opening formed by the loose fit of the tank B. Meanwhile hot water is at first discharged through the siphon tube E into the infusion tank but as soon as the infusion accumulates so as to cover the end of the siphon tube, creating a back pressure in the steam chamber $e$, the flow of hot water ceases and steam begins to form in the chamber $e$ and passing up through the siphon tube E is discharged at the bottom of the tank B and bubbles up through the coffee infusion as the latter accumulates. This result is attained through the small size of opening $g'$ which enables the internal pressure in the chamber $e$ to exclude the water until the pressure is relieved by the steam blowing out through the siphon tube. After this takes place a new supply of water flows in, is at once converted into steam and checks the inflow of water until the blowing off of the steam again relieves the pressure. This intermittent discharge of steam is kept up furnishing a supply of steam for keeping the infusion a trifle below the boiling point, softening the coffee grains and causing an agitation in the infusion tank which helps to extract the soluble matter from the coffee. The amount of liquid held in the tank B in proportion to the amount of coffee is such that when the tank is filled up to the overflow pipe $b^2$ the infusion will be a strong one and suitable when mixed with the whole amount of water to make coffee of the desired strength.

As soon as liquid is seen or heard to drop from the pipe $b^2$, the urn is moved back on the cooler part of the stove or placed in a position where it will not boil and the condensation of the steam in the tube E starts the siphon and draws the strong infusion down into the lower tank where it is diluted by the larger body of water. The water in the tank B can never be at the boiling point and it remains constantly at a few degrees below this point so that the coffee is allowed to steep for a considerable length of time, varying in practice from 10 to 12 minutes in water just below the boiling point. As a result, all the desirable ingredients of the coffee are removed while the deleterious elements such as tannic acid which only come out in boiling, are largely left in the grounds. The coffee thus made will be of uniformly good quality, of full strength and it is made with little or no care and attention. All it needs is to be placed in a cooler place when the overflow begins.

In Fig. 4 I have shown a modification in which the rate at which the water flows into the top of the container C and thence into the infusion tank B is more accurately regulated and the time of the operation determined if more accurate regulation is desired. On the upper end of the cylinder C I fit a small governing tank H having a central vertical nipple $h^2$ which fits closely over the upper end of the pipe D the latter being prolonged somewhat for this purpose. This tank has a cover as shown and in the bottom are one or more small openings $h'$ which let water down through into the cylinder C. The main cover $b^3$ is made without the flange $b'$.

In operation the water as it boils up through the pipe D fills the tank E up to the level of the top of the pipe and at once begins to run through the holes $h'$ and throughout the operation all the water which enters the tank B must pass through the holes $h'$. If the water comes up through the pipe D faster than it will run off through the holes $h'$, it will accumulate to a limited depth over the end of the pipe D and when this happens a pressure is created in the pipe which prevents the water from passing up through and the ebullition takes place through the opening $g^2$. After water enough has run off to free the upper end of the pipe D from back pressure, hot water will again begin to flow and the supply in the tank H will thus be kept up. It is thus immaterial how fast the water boils provided it keeps boiling, as the same amount will always enter the tank B in the same length of time since it must all pass through holes $h'$, and the coffee thus will always steep the same length of time.

While I have described my device as a coffee urn and particularly adapted to preparing coffee it may be used equally well for preparing tea, drugs or other substances from which infusions are made.

I do not desire to limit myself to the exact construction herein shown and particularly described, but these details may be varied without departing from the spirit of my invention.

If desired the overflow pipe may be omitted as the exact time of operation is not important and there is not the same danger of too much cooking as there is when the coffee is boiled.

The apparatus may be simplified by dispensing with the hot water pipe D and starting the operation by placing a limited quantity of water, preferably hot, in the infusion tank. The steam passing up through the siphon tube will keep the water hot and the condensed steam will gradually raise the level up to the overflow pipe $d^2$ or the length of the operation may be simply timed.

It will be seen that the apparatus unlike most coffee urns is perfectly adapted to make tea since the infusion is never allowed to boil and the tea leaves are submerged in the infusion water, a thing which is necessary since tea cannot be percolated in the same way as coffee. The fact that the boiling chamber is formed of the flanged disk resting loosely on the bottom prevents the water in the hot water tank from all boiling up into the infusion tank because when the level of the hot water approaches the top of the boiling chamber the pressure required to force the hot water up through the tube D will be greater than to force it out through the opening $g^2$ and under the flange $g^3$. The result is that there is no danger of boiling the lower tank dry.

The size of the lower tank is made relatively large in horizontal area and the parts are so proportioned that preferably only about five-eighths of the water can boil up into the upper tank. When the device is used in the small sizes for domestic use the hot water tank is formed of an ordinary coffee pot preferably one with a large horizontal area and the "infuser" or special mechanism is simply set in as shown in the drawings. The deflecting flange $b'$ in that case is done away with and the coffee pot cover is used to cover the top of the infusion tank. When the device is made for tea the tell-tale pipe is placed lower down so as to overflow in about five minutes or whatever length of time is desired to steep the tea.

It has been found by experience that by using my apparatus for making coffee a very great saving in coffee is made because practically all of the soluble elements are removed although only about fifty per cent. as much tannic acid is found in the infusion as when the coffee is made by boiling it for two minutes. Coffee made in my apparatus is consequently more healthful and less injurious than that made by the boiling process.

I claim:—

1. The herein described apparatus for preparing coffee and other like infusions consisting of a hot water tank, an infusion tank, a boiling chamber adjacent to the bottom of said hot water tank, a hot water supply pipe leading from said boiling chamber to said infusion tank and terminating in the upper part thereof and a coffee receptacle for said infusion tank located therein and having pervious walls substantially in contact with the bottom of said infusion tank whereby the coffee is brought into constant contact with the water in the infusion chamber.

2. The herein described apparatus for making infusions comprising a hot water tank, an infusion tank separated therefrom, a supply pipe for conveying boiling water from the hot water tank to the infusion tank, and an independent pipe serving during the boiling operation to convey steam to the infusion tank and upon cooling as a return pipe to convey the liquid from the infusion tank to the hot water tank.

3. The herein described apparatus for making coffee and other like infusions comprising a hot water tank, an infusion tank, a steam chamber adjacent to the bottom of the hot water tank, said steam chamber having a relatively small connection with the hot water tank and a steam pipe extending from said steam chamber to the lower portion of the infusion tank.

4. The herein described apparatus for making coffee and other like infusions comprising a hot water tank, an infusion tank, a steam chamber adjacent to the bottom of the hot water tank having a relatively small opening into the hot water tank and a siphon tube connecting the steam chamber with the infusion tank and terminating adjacent the lower portion thereof.

5. The herein described apparatus for making coffee and other like infusions consisting of a hot water tank, an infusion tank, a boiling chamber and steam chamber adjacent to the bottom of the hot water tank, a hot water supply pipe connecting the hot water chamber and a steam pipe connecting the steam chamber with the infusion tank.

6. The herein described apparatus for making coffee and other like infusions comprising a hot water tank, an infusion tank located above the hot water tank, a boiling chamber in the hot water tank adjacent to the bottom thereof, a hot water pipe leading from the boiling chamber to the infusion tank and a siphon for discharging the contents of the infusion tank into the hot water tank.

7. The herein described apparatus for making coffee and other like infusions comprising a hot water tank, an infusion tank located above the hot water tank, a boiling chamber and a steam chamber, each in communication with the hot water tank and located adjacent to the bottom thereof, a hot water pipe leading from the boiling chamber to the infusion tank and a siphon tube leading from the steam chamber into the infusion tank and terminating adjacent the lower portion thereof.

8. The herein described apparatus for making coffee and other like infusions comprising a hot water tank, an infusion tank adapted to fit in the upper end of the hot water tank, a hot water pipe extending vertically through the infusion tank and secured thereto, a horizontal diaphragm on the lower end of the hot water pipe, supporting flanges on the diaphragm forming a boiling chamber in communication with the hot water pipe, and a steam chamber having a small aperture opening into the hot water tank and a siphon tube connecting the steam chamber with the infusion tank and terminating adjacent the lower portion thereof.

9. The herein described apparatus for making coffee and other like infusions comprising a hot water tank, an infusion tank adapted to fit in the upper end of the hot water tank, a hot water pipe extending vertically through the infusion tank, terminating in the upper end thereof and secured thereto, a horizontal diaphragm on the lower end of the hot water pipe, supporting flanges on the diaphragm forming a boiling chamber and a steam chamber adjacent to the bottom of the hot water tank, both of said chambers being in communication with the hot water tank, a siphon tube connecting with the steam chamber and extending into the infusion tank and terminating adjacent the lower portion thereof, an open topped pervious cylinder having a vertical tubular center adapted to fit on the upper end of the hot water pipe to form a coffee receptacle and an overflow pipe in the infusion tank adapted to overflow outside of the coffee urn.

In witness whereof I have hereunto set my hand this 4th day of March, 1908.

ELMER N. BACHELDER

Witnesses:
  Geo. R. Dame,
  S. W. Bates.